United States Patent [19]

Dunn et al.

[11] Patent Number: 4,544,193
[45] Date of Patent: Oct. 1, 1985

[54] ROBOT GRIPPERS

[76] Inventors: Jimmy L. Dunn, 405 Apple Blossom La., Hurst, Tex. 76053; Lonnie D. Gilstrap, 1915 Mimosa, Arlington, Tex. 76012; Ronny L. Land, 124 Kenshire Dr., Benbrook, Tex. 76126; Frank C. Romeo, 7513 Lochwood Ct., Fort Worth, Tex. 76179

[21] Appl. No.: 482,600

[22] Filed: Apr. 6, 1983

[51] Int. Cl.⁴ .............................................. B25J 15/02
[52] U.S. Cl. ...................................... 294/86.4; 294/106
[58] Field of Search ................... 294/86 R, 88, 67 BC, 294/67 R, 106, 115, 116; 414/1, 4, 5, 6, 7, 729, 730, 735, 738, 739

[56] References Cited

U.S. PATENT DOCUMENTS

| | | | |
|---|---|---|---|
| 2,732,083 | 1/1956 | Smith | 214/1 |
| 2,857,194 | 10/1958 | Brown | 294/86 R |
| 3,199,910 | 8/1965 | Bradley | 294/88 |
| 3,287,057 | 11/1966 | Gallapoo | 294/86 R |
| 3,904,234 | 9/1975 | Hill et al. | 294/86 R |
| 4,336,926 | 6/1982 | Inagaki et al. | 269/34 |
| 4,456,293 | 6/1984 | Panissidi | 294/86 R |

Primary Examiner—James B. Marbert

[57] ABSTRACT

A robot gripper for grasping objects. The gripper has a pair of fingers slidably mounted on a hand so the fingers may be moved in opposite directions along parallel axes. Each finger has a rack attached, and each rack is, in turn, drivingly engaged by a pinion. The pinions are rotatably mounted in the hand, and each has a link pivotally connected to the outer perimeter of the pinion. The other ends of the links are attached together and to the piston rod of a fluid cylinder. As the piston rod is moved, the links rotate the pinions in opposite directions, driving the racks and fingers together or apart, to selectively grasp or release objects.

5 Claims, 2 Drawing Figures

ROBOT GRIPPERS

BACKGROUND OF THE INVENTION

1. Field of the Invention

This invention relates in general to robot grippers and in particular to robot grippers in which the fingers move in opposite directions along parallel axes.

2. Description of the Prior Art

In the field of robotics there are many applications in which it would be preferable for the fingers of the robot gripper to move along parallel axes, rather than pivoting around a point. For example, when a robot is grasping cylindrical objects fingers moving along parallel axes will grip better than pivoting fingers.

Devices have previously been designed to move clamps along parallel axes. For example, in U.S. Pat. No. 2,732,083 (Smith) a pinion gear rotates to drive two racks in opposite directions along parallel axes. The racks are in turn attached to the clamping tongs. U.S. Pat. No. 3,199,910 (Bradley) discloses a similar system in which a single pinion drives two racks attached to the jaws of the device. Both the Smith and the Bradley devices have rotating drive shafts to drive the pinions.

In U.S. Pat. No. 3,287,057 (Gallapoo) links are attached to rack and pinion assemblies. As the links are raised, the pinions drive the racks to close the jaws of the device.

SUMMARY OF THE INVENTION

The general object of this invention is to provide an improved robot gripper in which the fingers of the gripper are moved in opposite directions along parallel axes.

The above object is accomplished by attaching a rack to each finger. Each rack is driven by a pinion which is rotatably mounted on the robot gripper hand.

A driven means is provided for rotating the pinions in opposite directions. As the pinions rotate, the racks and the attached fingers are moved in opposite directions along parallel axes.

The drive means preferably includes a pair of links, each link being connected at one end to the outer perimeter of a pinion. The other ends of the links are preferably connected to a piston rod which is moved by a piston and fluid cylinder. As the piston rod is retracted, the rod pulls the links, thus rotating the pinions and closing the fingers.

The above as well as additional objects, features and advantages of the invention will become apparent in the following detailed description.

DESCRIPTION OF THE PREFERRED EMBODIMENT

Figure 1:
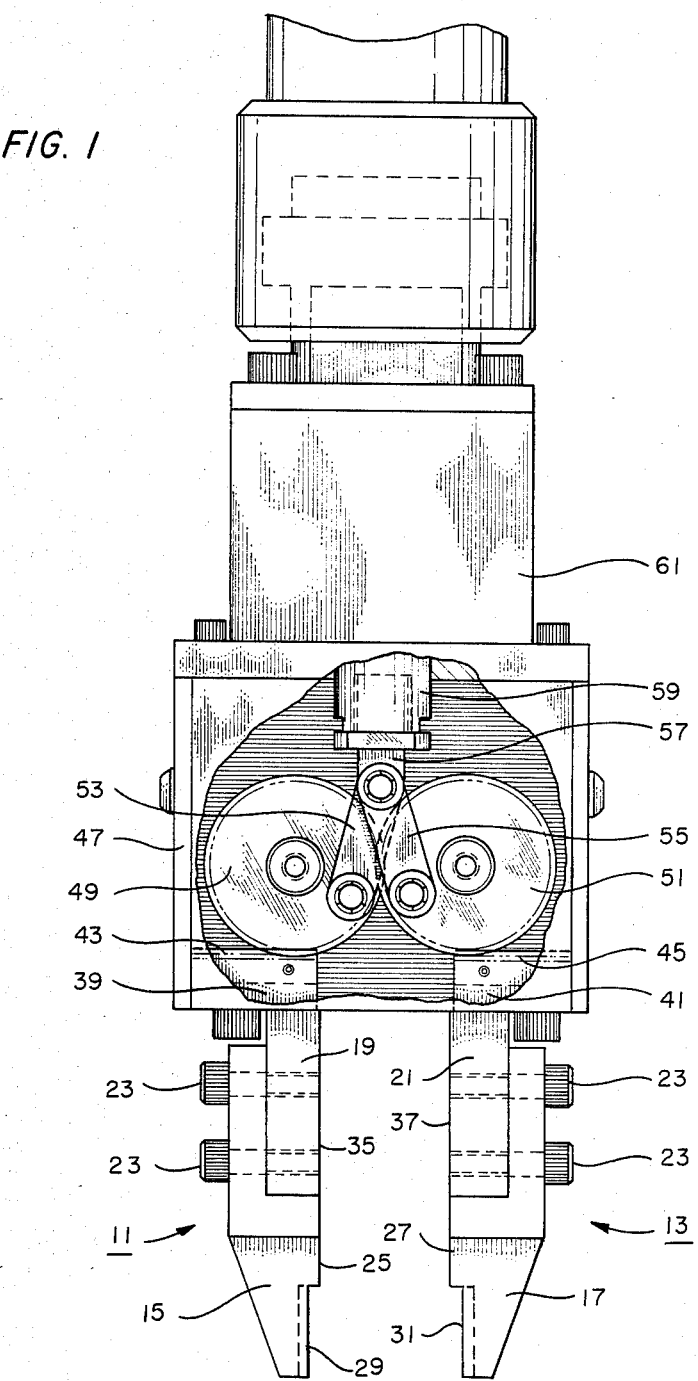
FIG. 1 is a side view, partially in section, of a robot gripper with the fingers in the open position.
Figure 2:
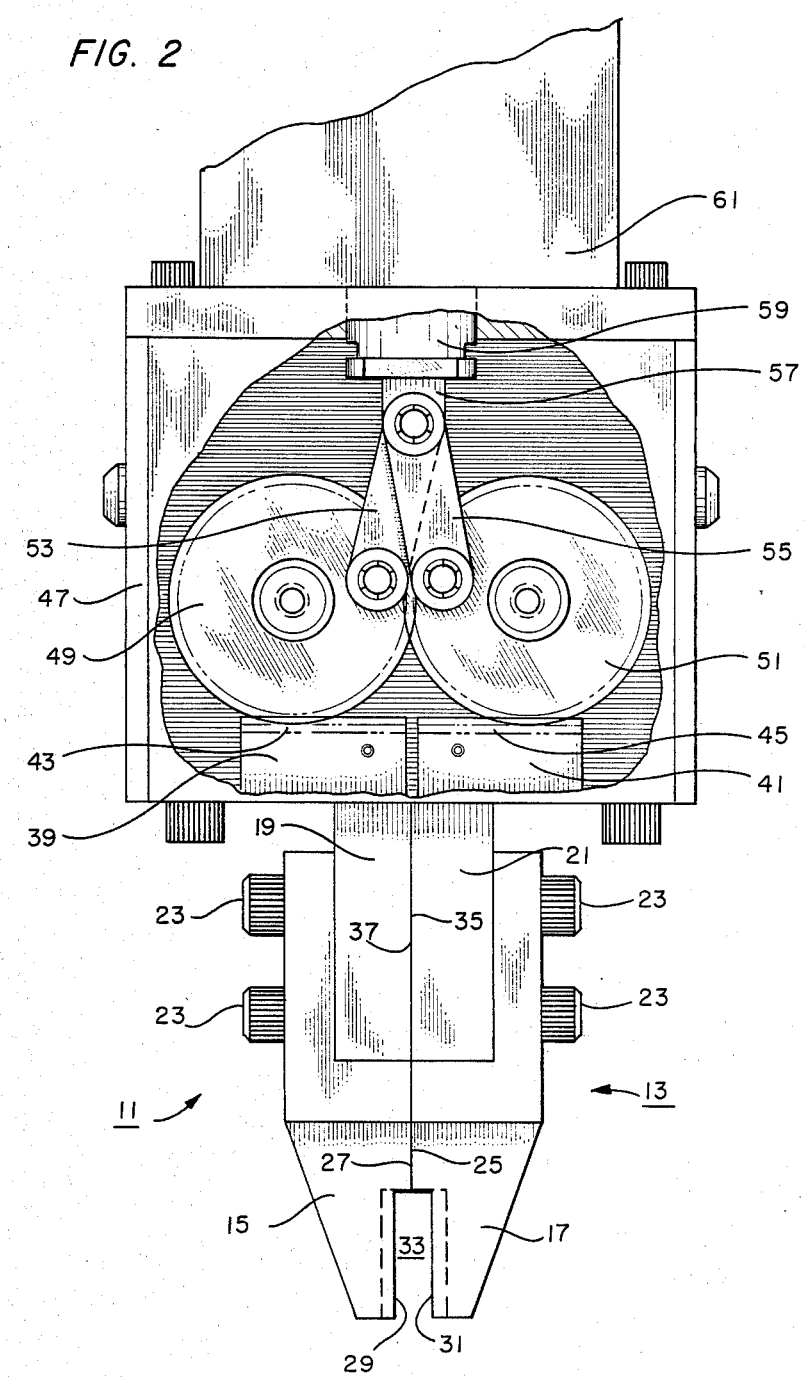
FIG. 2 is an enlarged side view, partially in section, of a robot gripper with the fingers in the closed position.

FIGS. 1 and 2 depict the preferred embodiment of the invention. In FIG. 1, the device is in the open position, and in FIG. 2 the device is closed. Each of the two fingers 11,13 of the device has a lower section 15,17 and an upper section 19,21, held together by bolts 23. The lower sections 15,17 have opposed faces 25,27 which come into contact when the device is fully closed, as shown in FIG. 2. Below these opposed faces 25,27, the lower sections 15,17 have gripping surfaces 29,31, which are recessed, so that when the opposed faces 25, 27 contact, a space 33 (shown in FIG. 2) remains between the gripping surfaces 29,31.

The upper sections 19,21 of the fingers 11,13 also have opposed faces 35,37 which contact when the fingers 11,13 close. The upper ends 39,41 of these upper sections 19,21 are connected to racks 43,45 which are perpendicular to the opposed faces 35,37. Both racks 43, 45 face upwardly in the same direction. The upper ends 39,41 of the fingers 11,13 are slidably mounted to a housing or hand 47, so the fingers 11,13 may move in opposite directions along parallel axes to selectively grip or release objects. The fingers 11,13 may move between a fully open position, shown in FIG. 1, and a fully closed position, shown in FIG. 2.

A pair of circular pinions 49,51 are rotatably mounted in the hand 47, with each pinion 49,51 having gear teeth engaging one of the racks 43,45. The pinions 49,51 have parallel axes that are perpendicular to the axes of the fingers. A link 53,55 is pivotally attached to the outer perimeter of each pinion 49,51. The other ends of the links 53,55 are pivotally connected together and to the end of a piston rod 57. The other end of the piston rod 57 is connected to a piston (not shown) in a fluid cylinder 59. Fluid pressure is supplied to the cylinder 59 through the robot arm 61 to which the hand 47 is attached. The cylinder 59, piston and piston rod 57 are the drive means for rotating the pinions.

In operation the fingers 11,13 of the robot are opened and closed in response to fluid pressure applied to the fluid cylinder 59. When fluid pressure is relieved, a spring (not shown) in the cylinder 59 forces the piston rod 57 down with respect to cylinder 59, and the rod 57 exerts a force against the links 53,55. As the links 53,55 move away from the cylinder 59, the links 53,55 cause the pinions 49,51 to rotate in opposite directions. The links 53,55 serve as translation means for rotating the pinions 49,51 in opposite directions in response to linear movement of rod 57. Specifically, link 53 rotates pinion 49 in a clockwise direction, and link 55 causes pinion 51 to rotate in a counterclockwise direction. As the pinions 49,51 rotate, the racks 43,45 are driven apart, and the fingers 11,13 open to the position shown in FIG. 1.

In order to close the fingers 11,13 and grasp an object, the operation is reversed. Fluid pressure is applied to the cylinder 59 to retract the piston rod 57. This action pulls the links 53,55 toward the cylinder 59 and rotates the pinions 49,51 in opposite directions. Link 53 thus rotates pinion 49 in a counterclockwise direction, while link 55 causes pinion 51 to rotate clockwise. The pinions 49,51, in turn, drive the racks 43,45 and the fingers 11,13 together. The fingers 11,13 thus close to the position shown in FIG. 2, or to some intermediate position sufficient to grasp a selected object.

In the embodiment shown, fluid pressure causes the piston rod 57 to retract and a spring in the cylinder 59 causes the piston rod 57 to extend. If desired these functions could be reversed, or fluid pressure could be used to both extend and retract piston rod 57.

The invention has significant advantages. The fingers move in parallel directions to better grip certain objects. The drive mechanism allows the use of a linear drive to open and close the fingers.

While the invention has been shown in only one of its forms, it should be apparent to those skilled in the art that it is not so limited, but is susceptible to various changes and modifications without departing from the spirit thereof.

I claim:

1. A robot gripper, comprising:
   a hand;
   a pair of fingers slidably mounted to the hand for movement in opposite directions along parallel axes, wherein the fingers have opposed faces to selectively grip or release objects;
   a pair of racks, wherein each rack is attached to the upper end of one of the fingers, and wherein each rack is perpendicular to the opposed faces and faces upwardly;
   a pair of pinions, rotatably mounted in the hand, wherein each pinion drivably engages one of the racks;
   a rod mounted in the hand;
   linear drive means for moving the rod linearly; and
   translation means, engaging the pinions and the rod, for rotating the pinions in opposite directions in response to linear movement of the rod, to cause the fingers to move in opposite directions.

2. A robot gripper, comprising:
   a hand;
   a pair of fingers slidably mounted to the hand for movement in opposite directions along parallel axes, wherein the fingers have opposed faces to selectively grip or release objects;
   a pair of racks, wherein each rack is attached to the upper end of one of the fingers and wherein each rack is perpendicular to the opposed faces and faces upwardly;
   a pair of pinions, rotatably mounted in the hand, wherein each pinion drivably engages one of the racks;
   a pair of links, wherein one end of each link is pivotally connected to one of the pinions; and
   linear drive means, connected to the other end of each link, for moving the other end of each link linearly, to cause the pinions to rotate in opposite directions and the fingers to move in opposite directions.

3. The gripper according to claim 2, wherein each pinion has an axis of rotation that is perpendicular to the axes of the fingers.

4. A robot gripper, comprising:
   a hand;
   a pair of fingers slidably mounted to the hand for movement in opposite directions along parallel axes, wherein the fingers have opposed faces to selectively grip or release objects;
   a pair of racks, wherein each rack is attached to the upper end of one of the fingers and wherein each rack is perpendicular to the opposed faces and faces upwardly;
   pinion gear means, rotatably mounted in the hand, for linearly moving the racks when rotatably driven;
   a piston rod;
   a piston and a fluid cylinder carried by the hand, and connected to the piston rod, for moving the piston rod linearly; and
   linkage means connected between the pinion gear means and the piston rod for rotating the pinion gear means in response to linear movement of the piston rod.

5. A robot gripper, comprising:
   a hand;
   a pair of fingers slidably mounted to the hand for movement in opposite directions along parallel axes to selectively grip or release objects;
   a pair of racks, wherein each rack is attached to one of the fingers;
   a pair of pinions, rotatably mounted in the hand, wherein each pinion drivably engages one of the racks, and wherein the pinions engage each other;
   a pair of links, wherein one end of each link is pivotally connected to one of the pinions;
   a piston rod connected to the other end of the links; and
   a piston and fluid cylinder, carried by the hand, for moving the piston rod linearly.

* * * * *